United States Patent [19]
Iwashita et al.

[11] Patent Number: 5,151,726
[45] Date of Patent: Sep. 29, 1992

[54] CAMERA OR PRINTER CAPABLE OF AUTOMATICALLY CHANGING PRINT SIZE

[75] Inventors: Tomonori Iwashita, Yokohama; Akira Egawa, Machida; Yoshiaki Sugiyama, Tokyo, all of Japan

[73] Assignee: Canon Kabushiki Kaisha, Tokyo, Japan

[21] Appl. No.: 349,531

[22] Filed: May 5, 1989

[30] Foreign Application Priority Data

| May 9, 1988 | [JP] | Japan | 63-113271 |
| May 9, 1988 | [JP] | Japan | 63-113272 |
| May 9, 1988 | [JP] | Japan | 63-113273 |
| May 9, 1988 | [JP] | Japan | 63-113274 |

[51] Int. Cl.⁵ .............................................. G03B 29/00
[52] U.S. Cl. ........................................ 354/75; 354/109; 354/106; 354/105; 355/40; 355/41
[58] Field of Search ................. 354/75, 76, 105, 106, 354/109; 355/40, 41, 43, 56; 352/92

[56] References Cited

U.S. PATENT DOCUMENTS

| 3,490,844 | 1/1970 | Sapp | 355/40 |
| 4,652,104 | 3/1987 | Harvey | 354/106 |
| 4,693,591 | 9/1987 | Saijo et al. | 355/41 |
| 4,811,042 | 3/1989 | Cloutier et al. | 354/106 |
| 4,812,871 | 3/1989 | Taniguchi et al. | 354/106 |
| 4,862,200 | 8/1989 | Hicks | 354/105 |
| 4,977,419 | 12/1990 | Wash et al. | 354/105 X |

FOREIGN PATENT DOCUMENTS

2083652A 3/1982 United Kingdom ............... 354/106

Primary Examiner—L. T. Hix
Assistant Examiner—D. Rutledge
Attorney, Agent, or Firm—Fitzpatrick, Cella, Harper & Scinto

[57] ABSTRACT

A photographic print control system includes a camera having the feature of indicating print size data and recording data relating to the print size so that a printer can read out the stored print size data and control a printing process for obtaining a print in the indicated size.

16 Claims, 17 Drawing Sheets

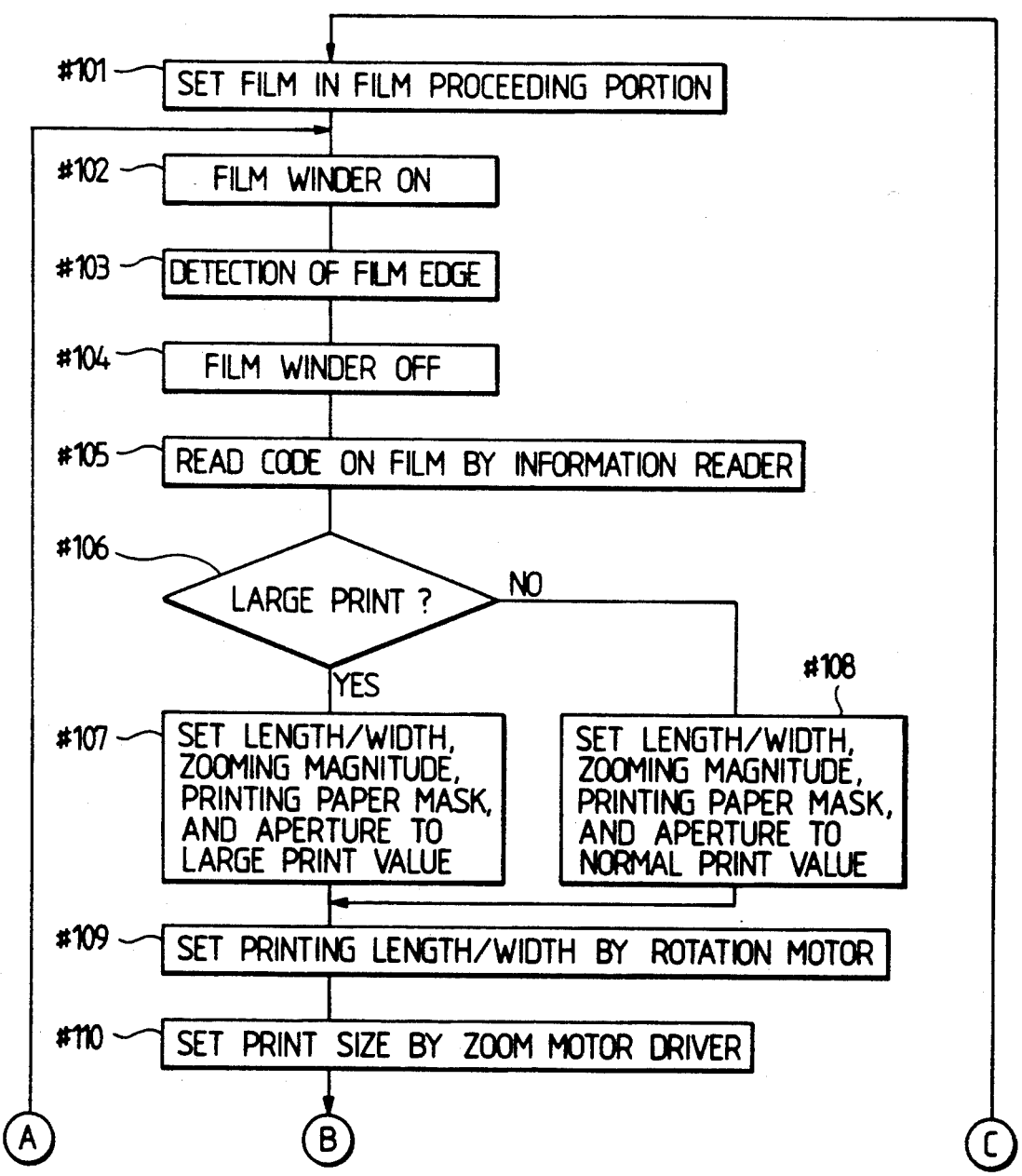

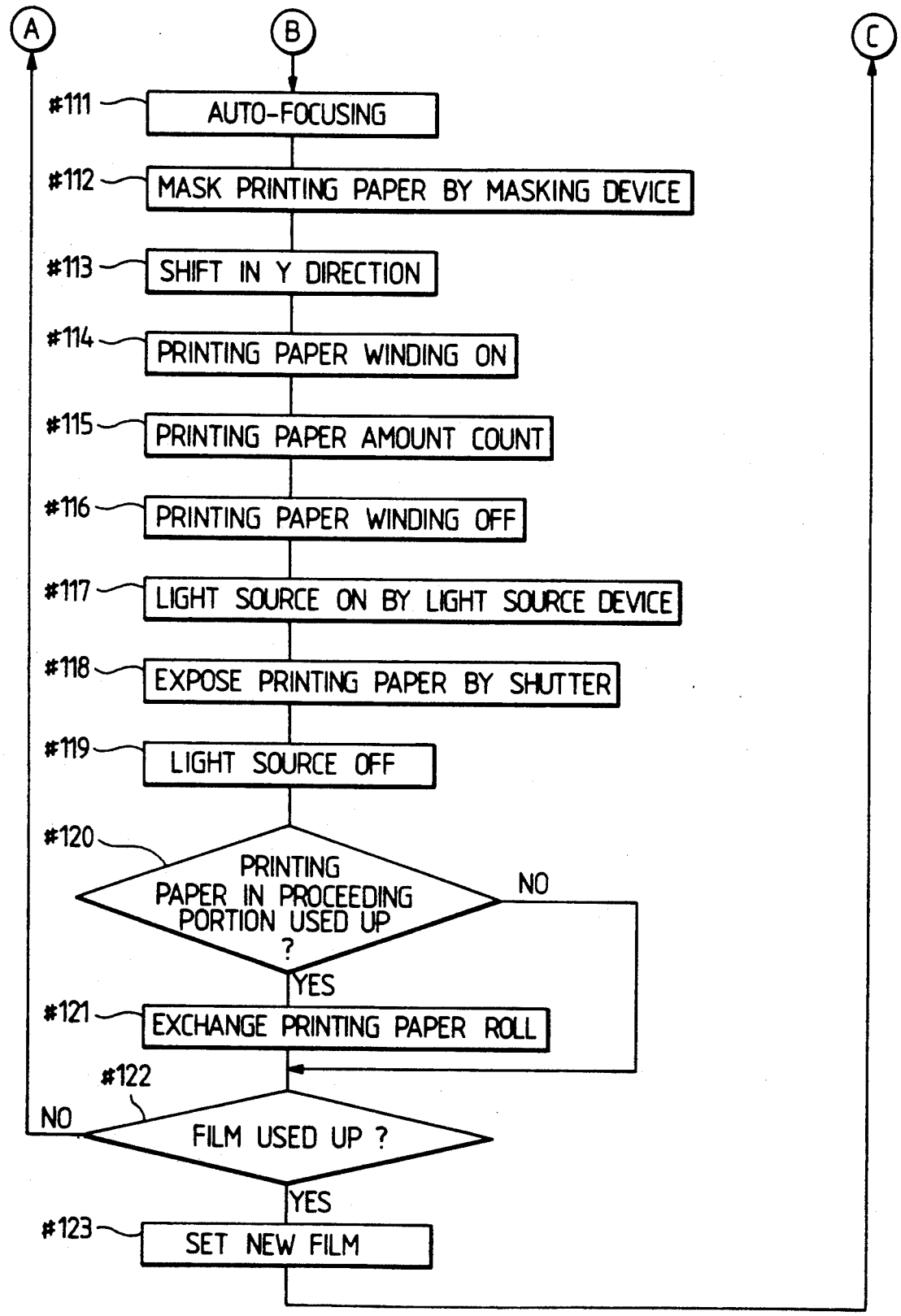

| FIG. 22A |
| FIG. 22B |
| FIG. 22C |

CAMERA OR PRINTER CAPABLE OF AUTOMATICALLY CHANGING PRINT SIZE

BACKGROUND OF THE INVENTION

1. Field of the Invention

The present invention relates to a camera or printer capable of automatically changing a print size.

2. Related Background Art

Recently spreaded widely available are simultaneous printing systems in which when one brings one or more rolls of exposed films to a development laboratory for developing each exposed frame is printed leading to the development and printing of all of the exposed films.

However, these prints have a predetermined size, i.e., a regular size (e.g., L size). In case of sourvenir pictures for example, only those pictures containing a large number of people may be desired to be enlarged (for instance, to 2 L size). To this end, it is again required to return to a laboratory to enlarge one or more prints after viewing and selecting the simultaneously printed prints in regular size.

From the standpoint of printing processing, in almost all the print systems, many exposed films are interconnected and then automatically and continuously printed so that the regular size prints can be processed at extremely inexpensive costs. However in the case of printing many prints from each frame of the negative film, a cost for each print becomes relatively expensive as compared with the simultaneous printing because a negative film is cut into a plurality of sections each containing generally six frames; each of the frames of the negative film from which a predetermined number of prints are desired to be printed are identified; a desired print size must be inputted into a printer. Thus, the steps for a plurality of prints from the same frame of the negative film are increased in number as compared with the simultaneous developing and printing systems. Especially in the case of printing one or more prints longer in width, printing papers in a special size are needed so that such prints cannot be printed by the conventional printers so that they must be manually printed, thus increasing the printing costs.

SUMMARY OF THE INVENTION

The present invention was made to substantially overcome the above and other problems encountered in the conventional cameras and printers and has for its object to provide a camera which, in addition to the component parts of the conventional cameras, further comprises setting means for setting a print size data and data storage means for storing therein the print size data thus determined, whereby prints of desired sizes can be easily obtained without increasing the printing costs and the manual processing steps.

Another object of the present invention is to provide a printer which, in addition to the component parts of the conventional printers, comprises read out means for reading out the print size data stored in the storage means and control means responsive to the read out print size data for printing a print of a desired size in a simple manner.

The above and other objects, effects and features of the present invention will become more apparent from the following description of preferred embodiments thereof taken in conjunction with the accompanying drawings.

BRIEF DESCRIPTION OF THE DRAWINGS

FIGS. 9 and 10, 10A, 10B respectively, show the circuit diagram of the printing apparatus of FIG. 6 and the operation flowchart thereof.

DETAILED DESCRIPTION OF THE PREFERRED EMBODIMENTS

Figure 1:
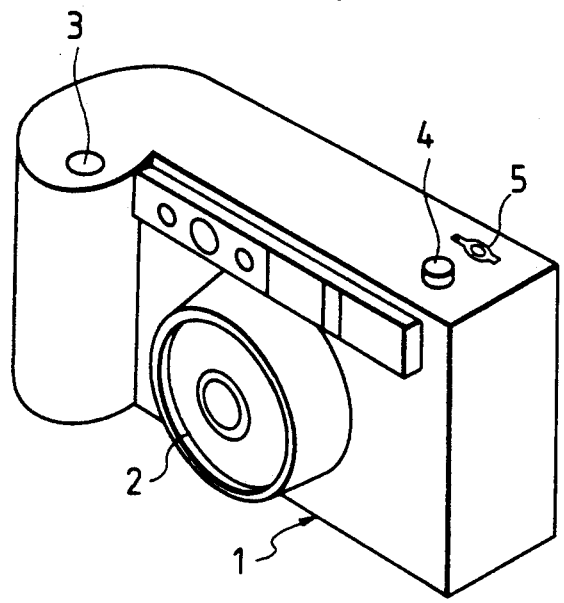
FIG. 1 shows a perspective view of a camera according to a preferred embodiment of the present invention.
Figure 2:
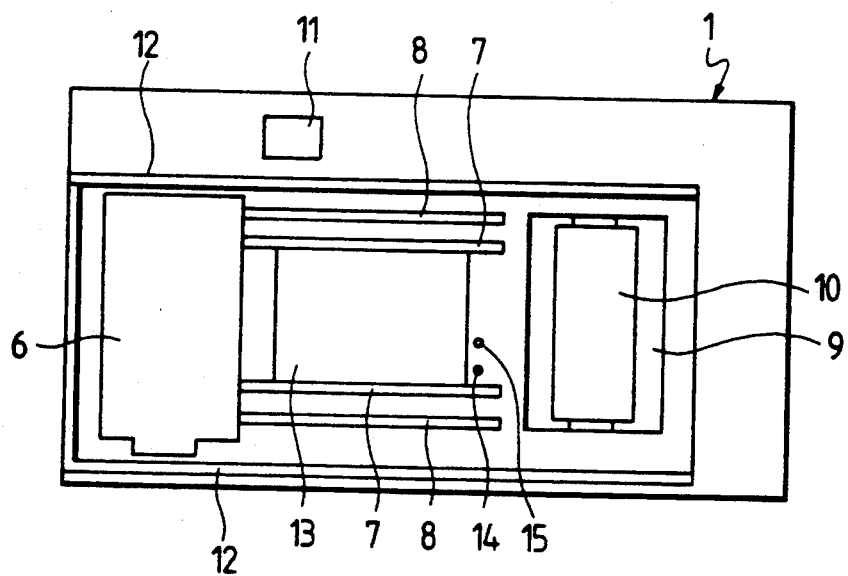
FIG. 2 is a back side view of the camera shown in FIG. 1.

FIG. 1 is a perspective view illustrating an external appearance of a camera to which is applied the present invention. Reference numeral 1 designates a camera body; 2, a photographic lens; 3, a shutter release button; 4, an enlargement setting button; and 5, a cancel button for cancelling an enlargement erroneously set which is in the form of a pawl, or the like in order to prevent an unintentional operation. FIG. 2 is a rear view of the camera shown in FIG. 1; that is, a view looking in the direction of the back cover thereof which is removed. Reference numeral 6 designates a film cartridge receiving chamber; 7, a pair of inner rails for controlling the position of a film with respect to the direction of the optic axis; 8, a pair of outer rails for controlling a vertical position of a film; 9, a spool chamber for taking up an exposed film; 10, a spool for winding up; 11, a viewfinder; 12, a pair of parallel grooves for engagement with the back cover (not shown); and 13, an aperture. All the component parts 1-13 described above are arranged in a manner substantially similar to the arrangement of conventional cameras. Reference numerals 14 and 15 denote light-emitting diodes, respectively, or any suitable light emitting means. Light emitting means 14 is used to imprint an enlargement signal on a film and light emitting means 15 is used to cancel or erase the imprinted enlargement signal.

Figure 3:
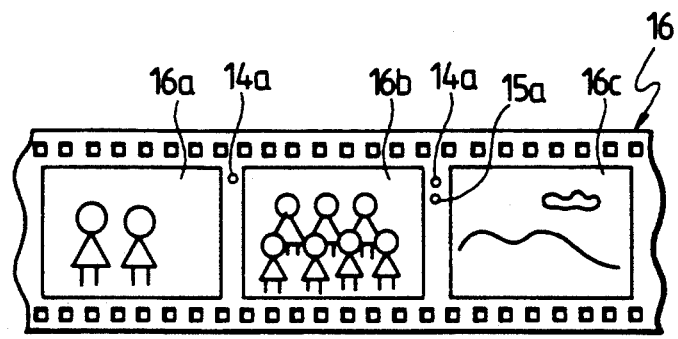
FIG. 3 shows a state of the recorded information by the camera shown in FIG. 1.

The mode of exposure including an enlargement signal of the camera with the above-described construction will be described. When one or more enlarged prints are desired, an operator pushes down the enlargement set button 4. Then, the light means 14 flashes once in response to a flash signal from a circuit to be described in detail hereinafter, so that, as best shown in FIG. 3, a portion of a film in opposing relationship with the light emitting means 14 is exposed, whereby an enlargement data 14a is recorded on the film. Thereafter, the shutter release button 3 is pushed down for exposure. However, when an operator erroneously has pushed down the enlargement setting button 4 or he/she notices that he/she has erroneously pushed the enlargement setting button 4 and then wants to cancel the exposure of the enlargement setting data 14a, it suffices to push down the cancel button 5. In this case, the enlargement data 14a is recorded by the flashing of the light emitting means 14 when the enlargement setting button 4 as described above, but when the cancel button 5 is pushed, the light emitting means flashes once in response to a flashing signal from the circuit to be described in detail hereinafter after so that, as best shown in FIG. 3, a portion of the film 16 in opposing relationship with the light emitting means 15 is exposed so that the cancel data 15a is recorded on the film 16. Thereafter, the shutter release button 3 is pushed down for exposure. When one or more enlarged prints are not needed, an operator just pushes down the shutter release button 3 in the well-known manner without pushing down the enlargement setting button 4. It follows therefrom that, in FIG. 3, a frame 16a is printed in regular size; a frame 16b is enlarged in printing; and a frame 16c is printed in regular size because the enlargement data 14a once exposed is cancelled by the cancel data exposure 15a.

Figure 4:
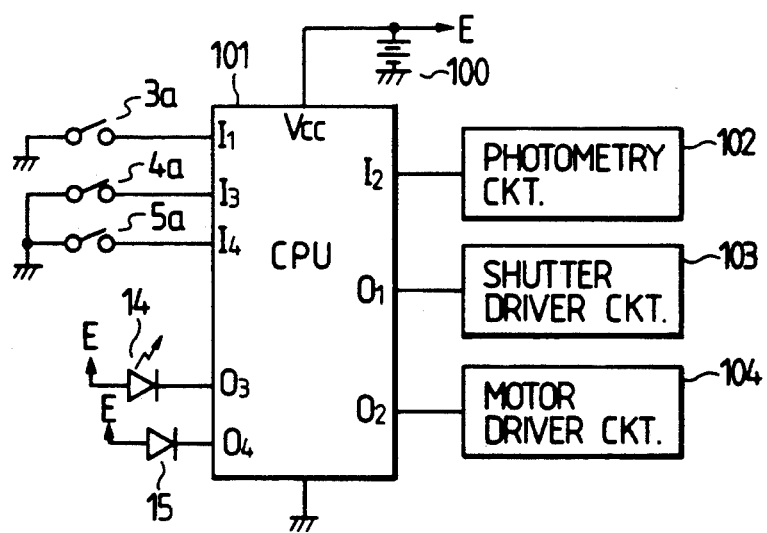
FIGS. 4 and 5 are circuit diagrams of the camera according to FIG. 1 and the operation flowchart thereof.

FIG. 4 illustrates a diagram of an electric circuit incorporated in the camera shown in FIG. 1. Reference numeral 100 designates a power supply for delivering a power E; 101, a CPU for controlling the operation of the camera; 102, a photometry circuit for measuring a degree of brightness of an object and generating a signal representative thereof; 103, a shutter driver circuit for controlling the exposure on a film; 104, a motor driver circuit for taking up the exposed film and rewinding the same; 14 and 15, light-emitting means described in detail with reference to FIG. 2; 3a, a relay switch coacting with the shutter release button 3; 42, an enlargement switch interconnected with the enlargement setting button 4; 5a, a switch coacting with the cancel button 5; $I_1$–$I_4$, input terminals; and $O_1$–$O_5$, output terminals.

Figure 5:
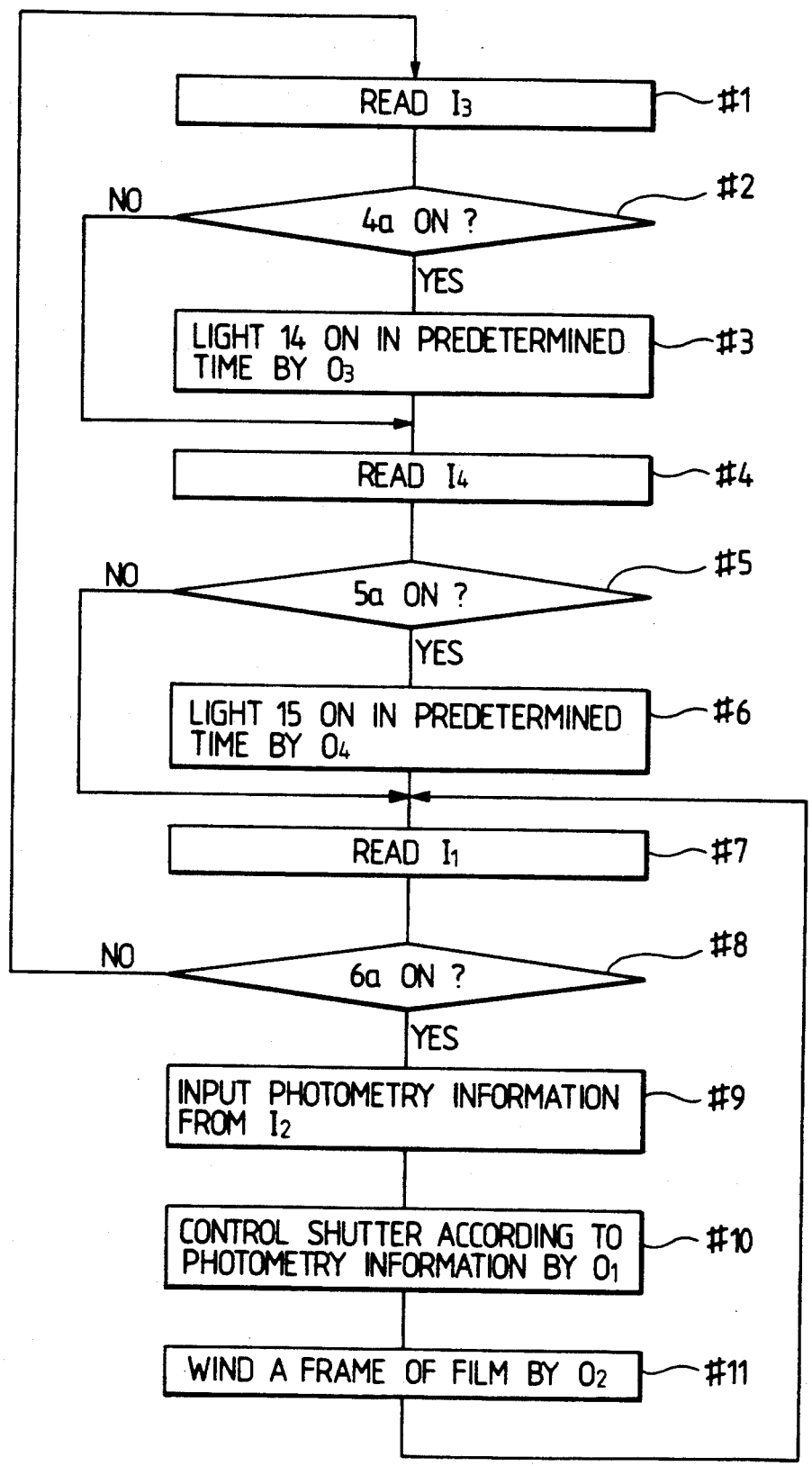

Next referring to the flowchart illustrated in FIG. 5, the mode of operation of the electric circuit described above with reference to FIG. 4. In the step #1, the state of the enlargement setting switch 4a is delivered to the input terminal $I_3$ of CPU 101 and in the next step #2, it is detected whether the switch 4a is closed. When the switch 4a is detected to be turned off, the exposure process proceeds to the step #4, but when the switch 4a is detected to be closed, the light emitting means 14 is flashed a predetermined time interval in response to the signal delivered from the output terminal $O_3$ of CPU 101 in the step #3 so that the enlargement setting data is exposed. In the step #4, the state of the cancel switch 5a is inputted to the input terminal $I_4$ of CPU 101 and in the step #5, it is detected whether or not the switch 5a is closed. When the switch 5a is detected to be turned off, the exposure procedure proceeds to the step #7, but when it is detected to be closed, the light emitting means 15 is flashed for a predetermined time interval in response to the signal delivered from the output terminal $O_4$ of CPU 101 in the step #6 so that the cancel code is exposed on the film. In the step #7, the state of the shutter release switch 3a is delivered to the input terminal $I_1$ of CPU 101. In the step #8, it is checked whether the switch 3a is closed. When the switch 3a is detected opened, the exposure procedure returns to the step #1. When it is detected that the switch 3a is closed, the exposure procedure proceeds to the step #9 in which the signal representative of a degree of brightness of an object is received from the input terminal $I_2$ of CPU 101. Next in the step #10, in response to the signal representative of the brightness of the object is delivered from the output terminal $O_1$ of CPU 101, the shutter driver circuit 103 is controlled so as to attain an optimum exposure of the object on the film. In the next step #11, the control signal for winding the film by one frame is delivered to the motor driver circuit 104 and then the exposure procedure is returned to the step #7. In the manner described above, the exposure procedure is repeated every time that an object is exposed.

Figure 6:
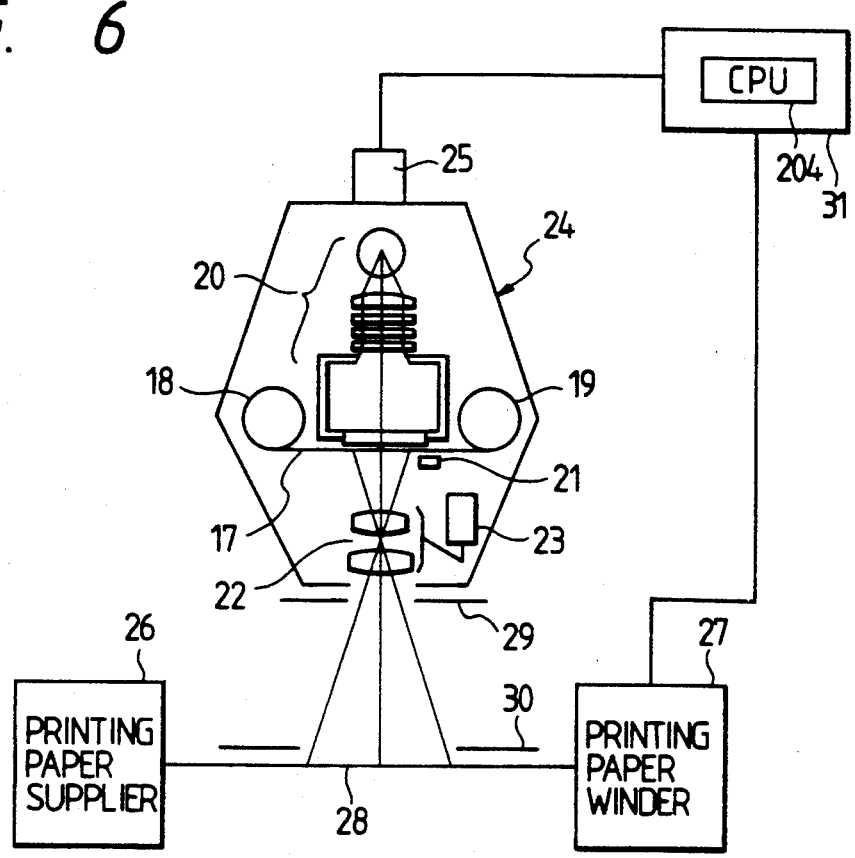
FIG. 6 shows a printing machine suitable for the camera depicted in FIG. 1.

FIG. 6 is a schematic view illustrating a printer best adapted for use with the camera shown in FIG. 1. In FIG. 6, reference numeral 17 designates a negative film unreeled from a film supply spool 18 and transported to a film take-up spool 19. At the center portion of the printer, a light source unit 20 comprising a lamp, a condenser lens, a diffusion plate and a mixing box is disposed. Below the lower surface of the negative film 17 are disposed a data reader 21, a printing zoom lens 22 and a zoom lens motor 23 for driving the zoom lens 22. The data reader 21 includes sensors for reading out an enlargement setting data and a cancel data, respectively. In a housing are the negative film 17, the negative film supply spool 18, the negative film take-up spool 19, the light source unit 20, the data reader 21, the zoom lens 22 and the zoom lens driving motor 23, thereby defining a printer head generally indicated by reference numeral 24. The printer head 24 is rotatably mounted on a printer main body. A motor 25 for rotating the printer head 24 can rotate the printer head 24 through 90° from its initial position. Under the zoom lens 22 are disposed a printing paper supplier 26 and a printing paper winder 27 so that a printing paper 28 is unreeled from the printing paper supplier 26 is transported to and taken up by the printing paper winder 27. Disposed in front of the zoom lens 22 is a shutter 29 for controlling the exposure in the case of printing and a mask member 30 for masking an unexposed portion of the printing paper 28 in the vicinity of the upper surface of the printing paper 28. A control unit generally indicated by reference numeral 31 and adapted to control the printer includes a CPU 204.

Figure 7:
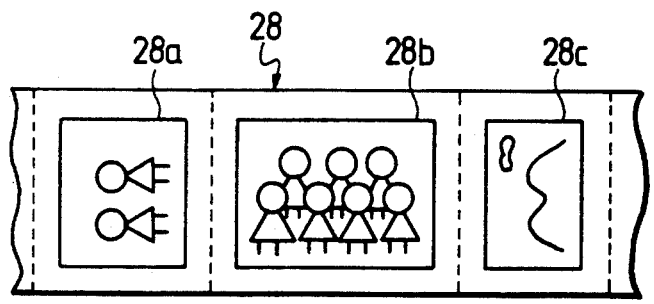
FIG. 7 is a print layout by the printing apparatus in FIG. 6.

Next the mode of operation of the printer of the type described above, with reference to FIG. 6, will be explained. When a negative film reaches the printer, a conventional frame edge sensor to be described in detail hereinafter detects the leading edge of the negative film 17 so that the film is stopped at a correct position. Next the sensors in the data reader 21 detect whether the enlargement print data 14a and the cancel data 15a are exposed on the negative film 18. When no enlargement print data 14a and the cancel data 15a are detected (as in the case of the frame 16a shown in FIG. 3) and when both the enlargement print data 14a and the cancel data 15a are detected (as in the case of the frame 16c shown in FIG. 3). The printer prints photographs in regular size as indicated by 28A and 28C in FIG. 7. In the case of the detection of the enlargement print data 14a by the data reader 21, the control unit 31 causes the zoom lens motor 23 to rotate so that the zoom lens 22 exposes the printing paper 28 in such a way that a print twice in size as large as the regular size can be obtained. Concurrently, the motor 25 is energized to rotate the print head 24 generally through 90° with respect to the regular-size print printing position. Then, a print is exposed as indicated by 28b in FIG. 7 on the rolled printing paper 28 extended flat between the printing paper supplier 26 and the printing paper winder 27. That is, the print 28b is enlarged in area twice as large as the print 28a exposed only pushing down the shutter release button and the print 28c exposed by pushing the cancel button 5 after pushing the enlargement setting button 4. The enlarged print 28b is rotated through 90° with respect to the regular size prints 28a and 28c. After the fixing process has been completed, when the printing paper is cut off along the dashed lines as shown in FIG. 7, the desired prints can be obtained.

Figure 8:
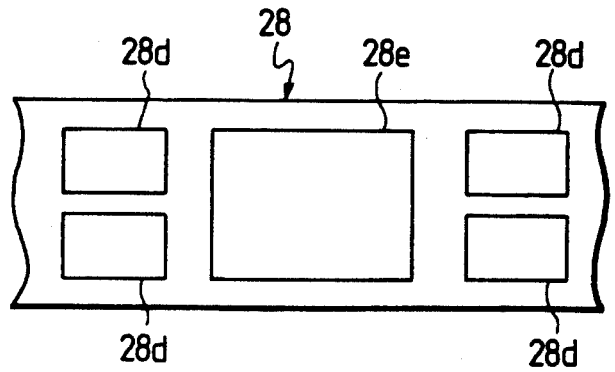
FIG. 8 shows another example of the print layout.

So far it has been described that in response to the enlarged print data 14a detected by the data reader 21 of the printer, both the zoom lens 22 and the head 24 are driven so that a print which is twice the area of regular size prints but, for instance, only the zoom lens 22 is driven by the zoom lens motor 23 to obtain a zoom ratio four times as high as the lowest zoom ratio and the printing paper 28 is displaced forwardly or backwardly in FIG. 6 by a Y-shift device to be described in detail hereinafter, it becomes possible to efficiently determine a layout of prints 28d in regular size and a print 28e enlarged four times in area as large as the prints 28d as shown in FIG. 8.

Figure 9:
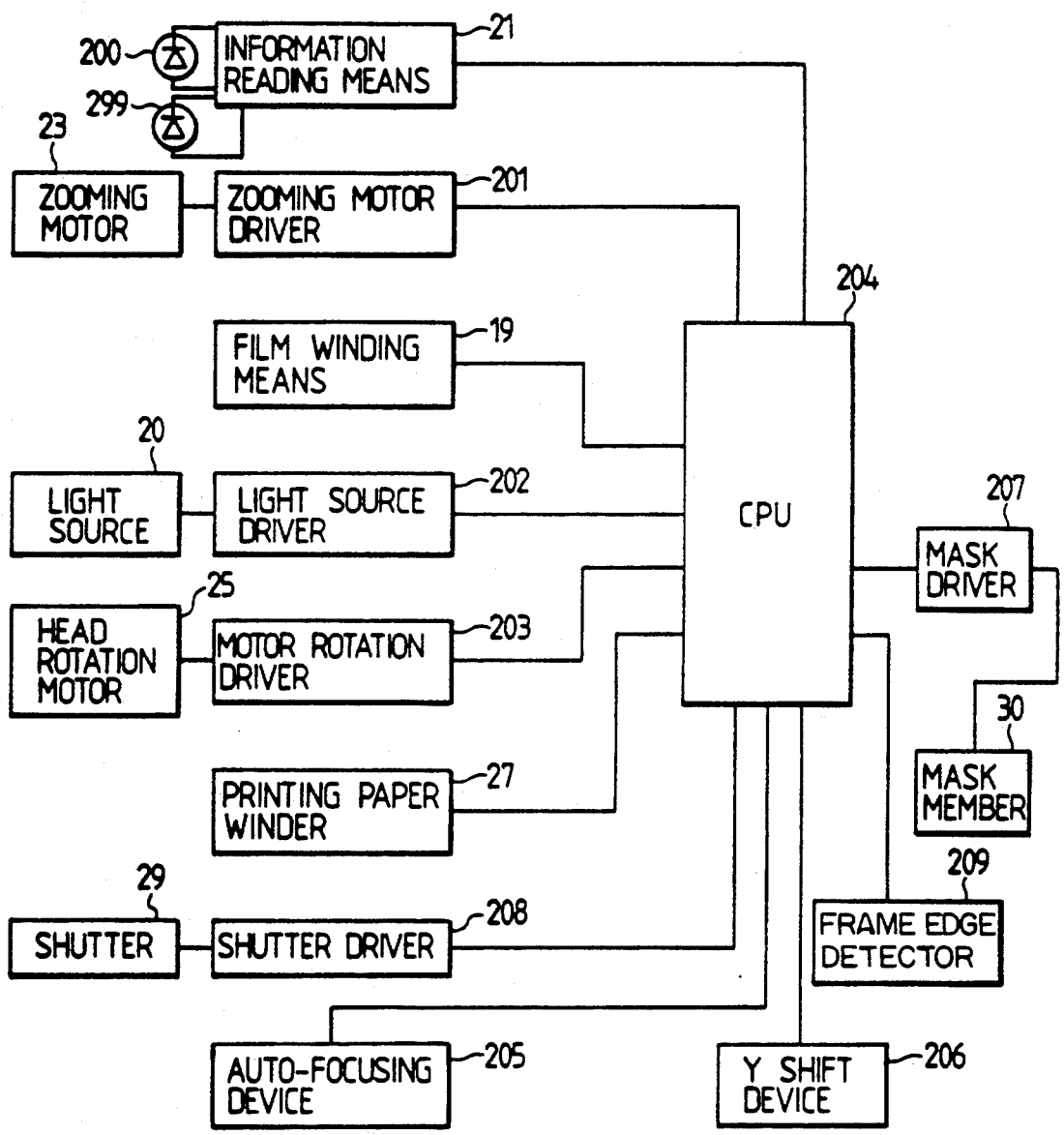

FIG. 9 is a diagram illustrating an electric circuit of the printer described above with reference to FIG. 6. In FIG. 9, reference numeral 21 represents information reading means comprising two sensor 299 and 200 which read out the enlargement print data 14a and the cancel data 15a, respectively, from the negative film and send the signals representative of the enlargement print data and the cancel data to a CPU generally indicated by reference numeral 204; 201, a zooming motor driver for driving the zooming lens 23 so that a print in desired size may be obtained; 19, a film winding means which is controlled by CPU 204 in such a way that the negative film is wound up to be set at a predetermined position; 202, a light source driver for controlling not only the light source unit 21 but also one or more color filters (not shown); 203, a motor rotation driver for rotating the head 24 of the printer through 90° at a time by energizing the head motor 25; 27, a printing paper winder for winding the negative film by one frame at a time and setting the next frame at a predetermined position; 208, a shutter driver for driving the shutter 29 so as to control a degree of exposure in the case of printing; 205, an auto-focusing device for automatically zooming the zooming lens so as to sharply focus a frame to be printed of the negative film 28; 206, the Y-shifting device for shift in the Y direction (perpendicular to the transportion path of the printing paper 28) the optic axis of the zoom lens in the case of printing prints in regular size such as 28d indicated in FIG. 8. The Y-shift device 106 is designed and constructed so that a motor shifts a stage upon which is placed the negative film 28 in the Y-direction. Alternatively, a stage which is movable in the Y-direction may be disposed in the vicinity of the negative film 17. Furthermore, like a conventional LS lens a printing zoom lens may be shifted from the optic axis in the Y-direction. Reference numeral 107 represents a mask driver for driving the mask 30 so as to mask an unexposed area of the printing paper; and 209, the sensor for detecting the leading edge of the negative film 28.

The operation of the circuit of FIG. 9 will now be described in accordance with the flowchart of FIG. 10.

At step #901 in FIG. 10, a film reel is set on film proceeding portion 18 to print the image on the film to the printing paper. Also in the printing paper proceeding portion 26, a printing paper roll is set. After that, the film winder is started at step #102. At step #103, a frame of the film is set at a predetermined position by detecting a film edge by film edge detector 209. Then, the film winder stops at step #104. At step #105, the information reader 21 reads the recorded codes 14a, 15a. The state of the code is judged at step #106, and in case of enlarged printing, the process proceeds to step #107 and otherwise, for normal printing, the process branches to step #108. At the step #108, a size of the printing paper length/width, zooming magnitude, printing mask, and aperture value are respectively set. In accordance with the setting value, the rotation motor driver 203 set the length/width of the film. At next step #101, the zoom lens 22 is controlled by the zoom lens driver based upon the setting value so that the film image becomes predetermined size on the printing paper. The auto focusing device ensures that the image on printing paper is in focus at step #111. The auto-focusing device may be located near the zoom lens 22 and it also may be possible to control the height of the head portion 24. At step 121, a part of the printing paper 28 is masked by a predetermined amount corresponding to the setting value. At step #113, the position in the Y direction of the device is controlled by the Y-shift device 206 to perform the regular printing 28d shown in FIG. 8. It can be easily accomplished, by memorizing the printing position of the preceding frame, to locate the device to an optimum position on the printing paper roll at which the photograph should be printed. In steps #114 to #116, the printing paper winder is started (#114), the feeding amount of the paper 28 is counted (#115), and the printing paper winder 27 is stopped (#116) thereby the printing paper being appropriately set. The light source 20 is turned on by the light source driver 102 at step #117, and the shutter driver 208 controls the shutter to obtain a predetermined exposure time at step #118. According to this embodiment, only one exposure is performed, however, in the case of the color printing, multi exposures are executed upon changing of the filters. The light source is turned off at step #119. At step #120, it is discriminated whether the printing paper in the printing paper supplier 26 still remains. If the printing paper is used up, a new printing paper roll is set up at step #121, and otherwise the process proceeds to #122. At step #122, it is checked whether the film still remains in the film supplier 18. If it still remains, process returns to step #102 to repeat the printing operation, and if no film remains, a new film is set at step #123 and process returns to step #101 to continue the printing operation.

It should be noted that, in the circuit diagram as described above, two types of printing operations, i.e., two times magnitude and 4 times magnitude, both can be performed. However, it would be apparent, by cancellation of the step either #109 or #119, that the device is fixed to 2 times magnitude or 4 times magnitude.

If, instead of obtaining an enlarged print as described above, a reduction print is desired, the wide side of the printing zoom lens 22 is enlarged so that a reduction optical system can be provided.

SECOND EMBODIMENT

Figure 11:
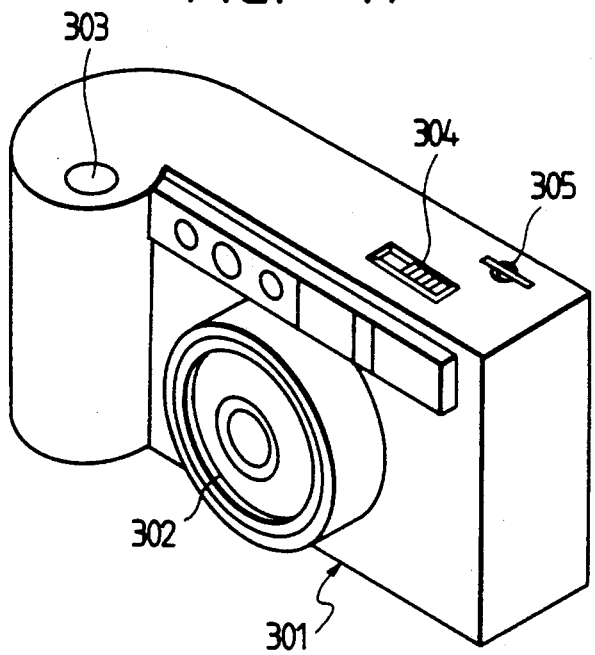
FIG. 11 is an another embodiment of the camera according to the present invention.
Figure 13:
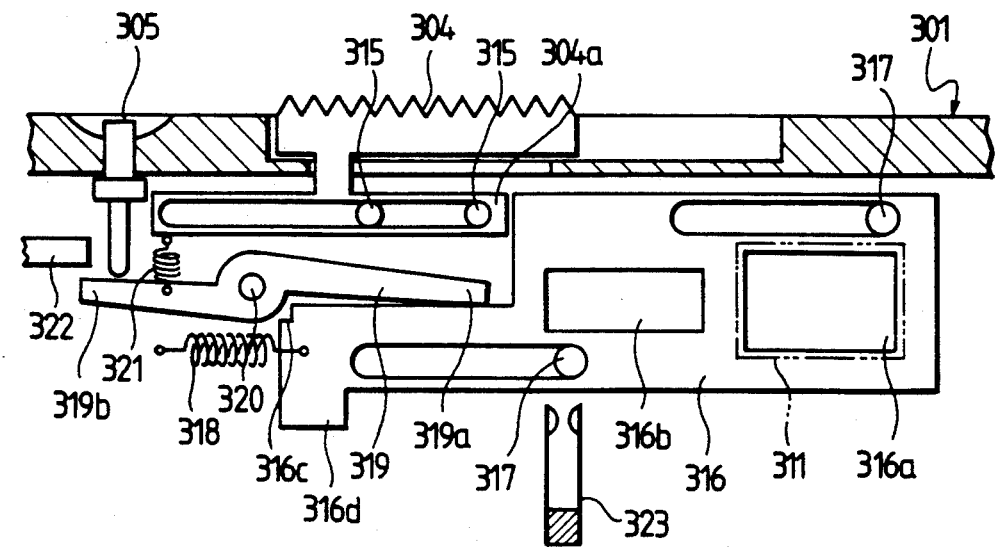
FIG. 13 shows the inside structure of the camera of FIG. 11.

FIG. 11 illustrates an exterior appearance of another embodiment of a camera in accordance with the present invention. Major component parts of this camera are a camera body 301, a photographic lens 302, a shutter release button 303, a widthwise enlarged print setting button 304, a cancel button 305 which is pushed down to cancel the enlarged-width print setting and is in the form or a pawl, for example, in order to prevent an operator from erroneously pushing it down. FIG. 13 is a rear view of the camera with the back cover removed. Reference numeral 306 designates a film cartridge housing chamber; 307, a pair of inner rails for controlling the position of the film in the optical axis; 308, a pair of outer rails for controlling the vertical position of the film; 309, a film winding chamber; 301, a spool for taking up the exposed film; 311, a viewfinder; 312, engagement grooves for engagement with the back cover (not shown); 313, an aperture; and 314, light emitting means such as light-emitting diode for exposing the enlarged-width print data on the film. FIG. 13 illustrates the internal construction of the camera and especially the interaction between an enlarged-width print setting lever 304, the cancel button 305 and a viewfinder 311. Reference numeral 301 denotes a partial sectional view of the camera body; 304, the enlarged-width print setting lever slidable to the right or left by fixed pins 315; 316, a field-of-view changing member for the viewfinder 311 and generally formed with a viewfinder frame 136a for obtaining a print in regular size and another viewfinder frame 136b for obtaining an enlarged-width print. A field-of-view changing member 316 is slidable by fixed pins 317 to the right or left and is normally biased to the left under the force of a spring 318; 319, a retaining lever pivotable about a fixed pin 320. One end 319a of the retaining lever 319 is engageable with a notch 316c of the view-of-field changing member 316 and is normally biased in the clockwise direction under the force of a bias spring 321. The other end 319b of the retaining member 319 is in opposing relationship with the leading end of the cancel button 305 and a lever 322 which interacts with a film winding mechanism or shutter release mechanism (not shown). Reference numeral 323 designates a detecting switch for detecting the enlarged-width print setting which is so designed and constructed in such a way that in the case of obtaining a print in regular size, it remains in the "OFF" stage, but in the case of obtaining a enlarged-width print, it is closed by a projection 316d of the changing or switching member 316.

Figure 14:
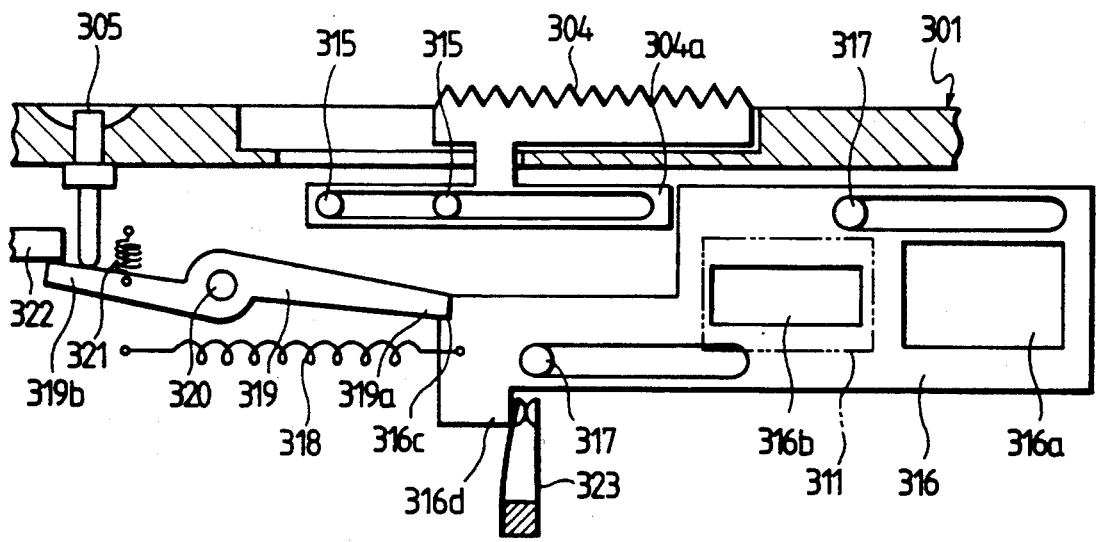
FIG. 14 shows the mechanical state when an enlarged-width print is designated.
Figure 15:
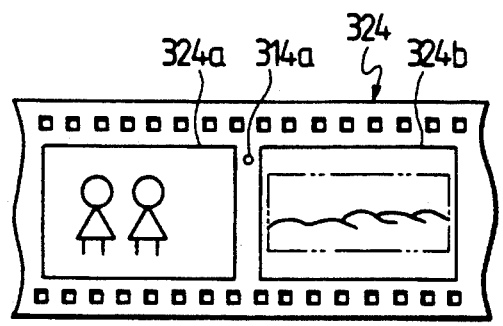
FIG. 15 shows the recording state of the film information.
Figure 16:
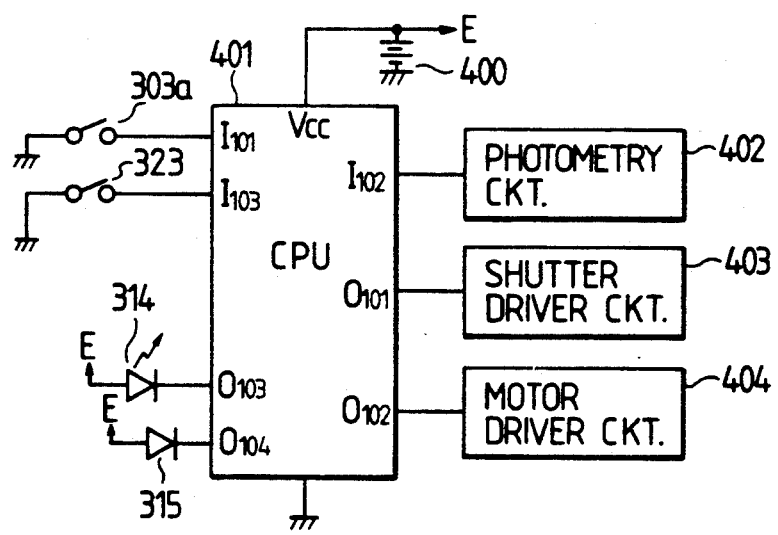
FIGS. 16 and 17, respectively, show the circuit diagram of the camera of FIG. 11 and the operation flowchart thereof.

Next, the mode of exposure for obtaining a widthwise enlarged print having the camera with the above-described construction will be described. In order to set the camera to obtain a widthwise enlarged print, first the widthwise enlarged print setting level 304 is displaced to the right in FIG. 14. Then, the leading end 304a of the lever 304 pushes the field-of-view switching member 316 to the right against the spring 318. When the changing or switching member 316 reaches to the right stroke end, the retaining lever 319 is rotated in the clockwise direction under the force of the bias spring 312 so that one end 319a of the retaining lever 319 engages with the notch 316c of the changing or switching member 316 as shown in FIG. 14. In this case, the field-of-view frame for enlarged-width print setting 316b of the changing or switching member 316 is aligned with the viewfinder 311 so that the field-of-view viewed through the viewfinder is defined so as to obtain an enlarged-width print. Concurrently, the detecting switch 323 is closed. When the shutter release button 303 is pushed down under these conditions, in response to a signal from a circuit to be described in detail hereinafter, the light-emitting means 314 flashes once so that, as shown in FIG. 16, a portion of a film 324 which is in opposing relationship with the light emitting means 114 is exposed; that is, the widthwise enlarged print data 314a is recorded on the film 324. In the case of the film take-up operation, after the shutter release button has been pushed down, the lever 322 is caused to rotate in the clockwise direction by a mechanism (not shown), pushing one end 319b of the retaining member 319. Then, the retaining member 319 is caused to rotate in the counterclockwise direction against the spring 321 and is released from the changing or selection member 316. Thereafter, the changing or switching member 316 is forced to slide to the left under the force of the spring 318 so that the field-of-view frame 316a for defining a view of field to be printed in regular size is aligned with the viewfinder 311 and the detection switch 323 is turned off. When the enlarged-width print setting lever 304 is erroneously moved or when an operator changes his/her mind and wants to obtain a print in regular size after the enlarged-width print setting lever 304 is moved, he/she pushes down the cancel button 305. Then, the leading end of the cancel button 305 pushes down the one end 319b of the retaining member 319, the latter is caused to rotate in the counterclockwise direction so that the other end 319a of the retaining member 319 is released from the notch 316c of the changing or switching member 136c so that the camera is returned to its normal position as shown in FIG. 13, whereby the widthwise enlarged print setting is released. In case of exposure to obtain a print in regular size, it suffices to push down the shutter release button 303 without operating the setting lever 304 as shown in FIG. 13. In this case, the light emitting means 314 does not flash because the detection switch is turned off so that the widthwise print data 314a is not imprinted on the film. Therefore, in the case of exposure to obtain a print in regular size, a picture frame 324a is obtained while in the case of exposure for obtaining an enlarged-width print, a picture frame 324b is obtained as shown in FIG. 15.

FIG. 16 is a diagram illustrating an electric circuit of the camera described above with reference to FIG. 11. Reference numeral 400 represents a power supply delivering a power supply voltage E; 401, a CPU for controlling the camera operation; 402, a photometric circuit for measuring a degree of brightness of an object and generating a signal representative thereof; 403, a shutter driver for controlling the exposure; 404, a motor driver for winding and rewinding a film; 314, the light emitting means described above with reference to FIG. 12; 303a, a release switch actuated by the shutter release button 303; and 323, a detection switch actuated by the widthwise print setting lever 430. $I_{101}-I_{103}$ are input terminals and $O_{101}-O_{104}$ are output terminals.

Figure 18:
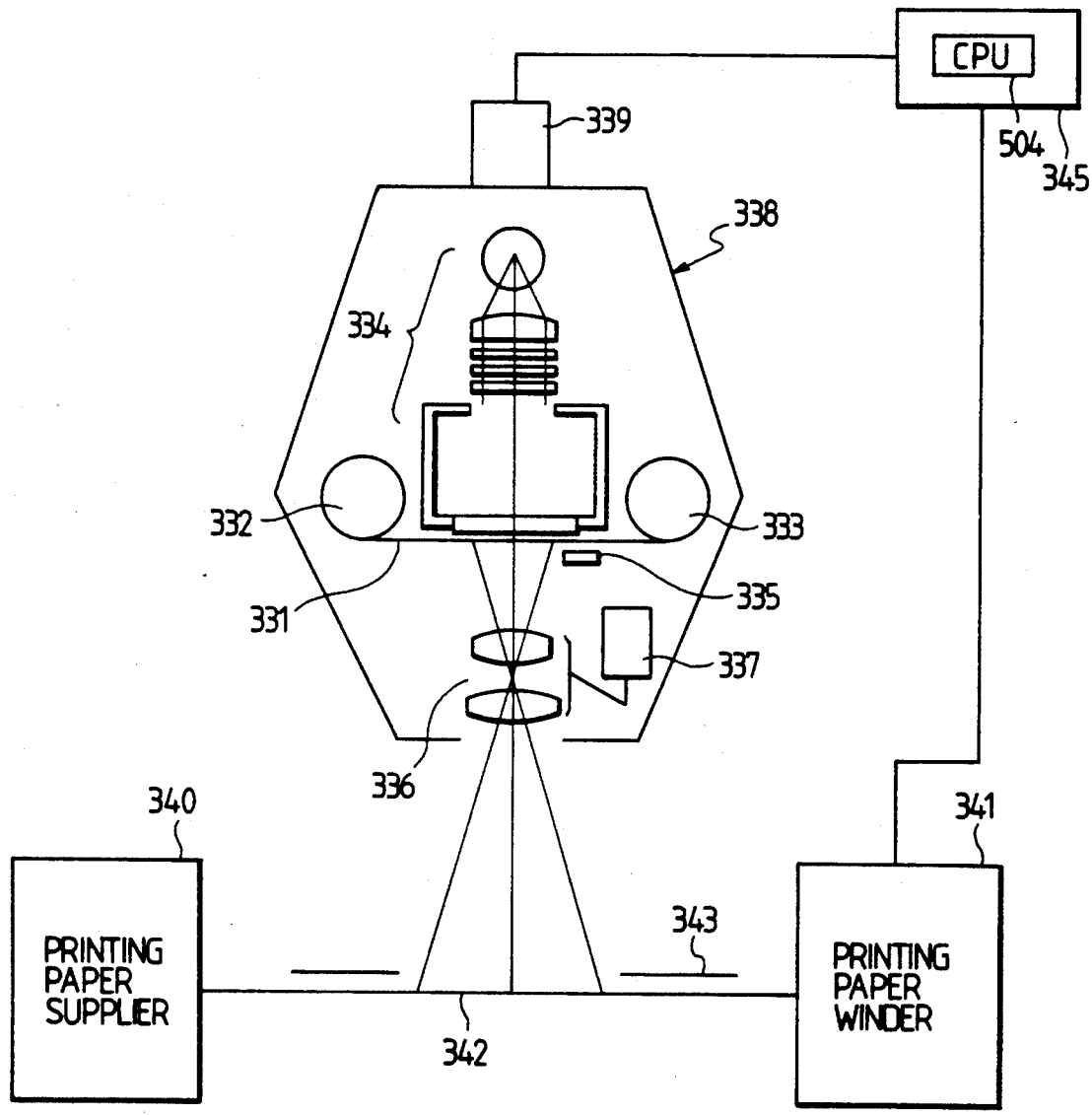
FIG. 18 is a perspective view of the printing apparatus suitable for the camera shown in FIG. 11.

Next, the mode of operation of the circuit shown in FIG. 16 will be described with reference to FIG. 18 illustrating a flowchart of the operation of the CPU 401.

Figure 17:
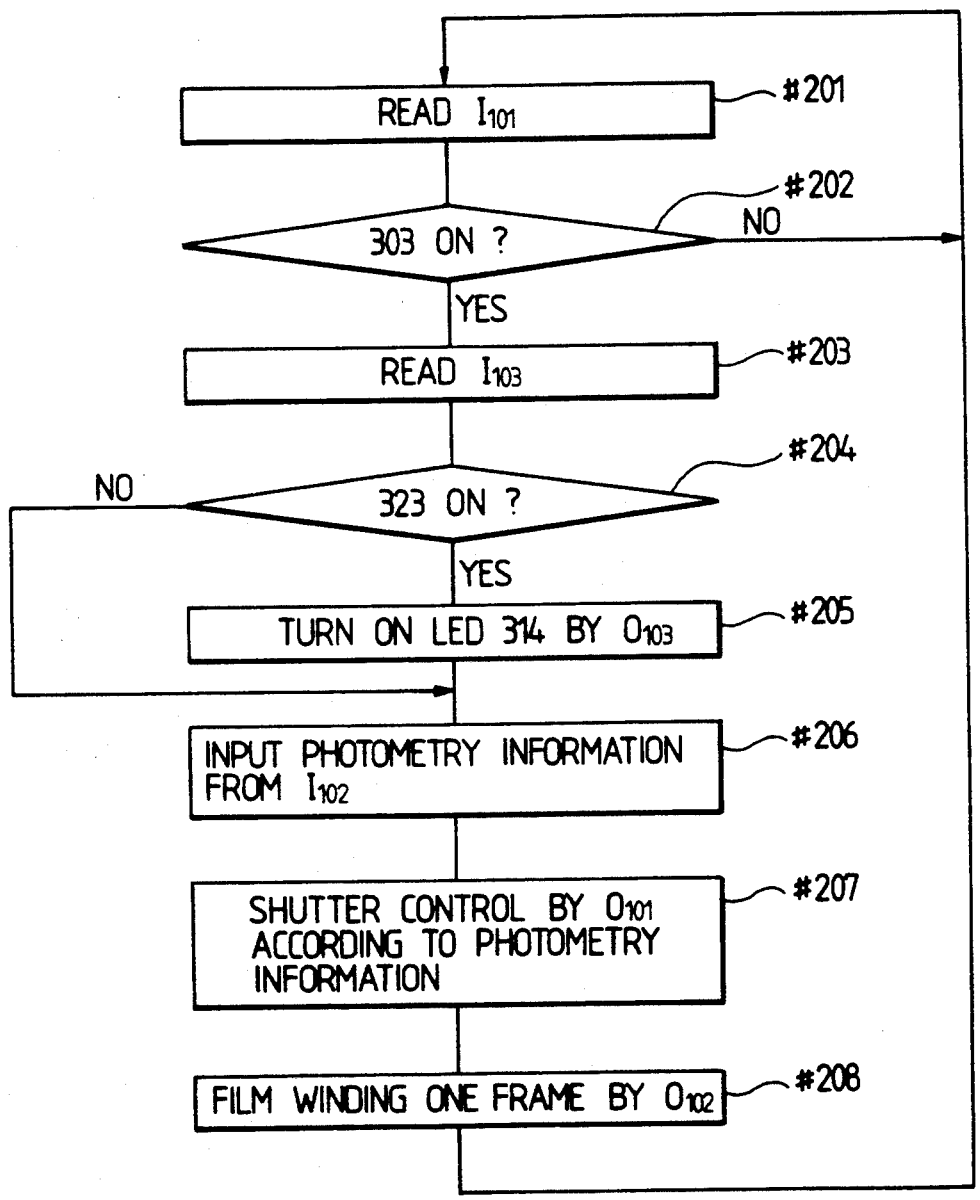

In FIG. 17, at step #201, the condition of the release switch 303a is input from the input terminal $I_{101}$ and is judged at the next step #202. If the switching state is OFF, the process returns to the step #120, and otherwise the process proceeds to #203 for reading the condition of the switch 323 from the input terminal $I_{103}$.

At step #204, if the switch 323 is ON, the process flows to step #205, and if the switch 323 is OFF, the process jumps to #206. At step #205, since an enlarged-width photograph is detected, the light emitting means is turned on by predetermined time by the output from $O_{103}$ to record the code 314a on the film. At step #206, the input terminal $I_{102}$ receives the photometry information concerning the luminance of the object. On the basis of the photometry information, at step #207, the shutter driver is controlled by the input terminal $O_{101}$, and the optimum exposure is given to the film. At last, a control signal for winding the film by one frame is output from the output terminal $O_{102}$ to the motor driver 404. Upon completion of above-described sequence, the process returns to the step #201.

FIG. 18 is a schematic view illustrating a printer best adapted for use with the camera described above with reference to FIG. 11. In FIG. 18, reference numeral 331 represent a negative film which is transported from a film supply unit 332 to a film take-up unit 333 which winds the transported film 331. At the center portion of the printer is disposed a light source unit 334 comprising a lamp, a condenser lens, a diffusion plate and mixing box. Below the negative film 331 are disposed data reader 335, a printing zoom lens 336 and a focusing motor 337 for sharply focusing each image on the negative film 331 on a printing paper 342. The data reader 335 includes a sensor for reading out the enlarged-width print data. The negative film 331, the film supply unit 332, the film take-up unit 333, the light source unit 334, the data reader 335, the printing zoom lens 336 and the zoom lens focusing motor 337 are disposed in the housing of the printer, thus constituting a printer head 338 which in turn is vertically slidably mounted on a printer main body (not shown). A head sliding motor 339 can vertically slide the head 338 form its initial position. Below the zoom lens 336 are disposed a printing paper supply unit 340 and a printing paper take-up unit 341 in such a way that the printing paper 342 supplied and transported from the printing paper supply unit 340 is taken up by the printing paper take-up unit 341. In front of the printing zoom lens 336 is disposed a shutter 343 for controlling the exposure in the case of printing and a mask member 344 for masking an unexposed portion of the printing paper 342 is disposed in the vicinity of the printing paper 342. A control unit 345 controls the operations of the above-described component parts and incorporates therein a CPU 504.

Figure 19:
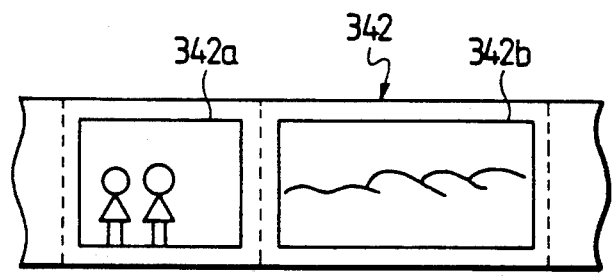
FIG. 19 is an example of the print layout printed by the printing apparatus of FIG. 18.

Next the mode of operation of the printer with the above-described construction will be explained. When the negative film 331 arrives, a frame edge is detected by a conventional frame edge sensor to be described hereinafter so that the negative film 331 is stopped and remains at a normal position. Thereafter the sensor in the data reader 35 detects whether the enlarged-width print data 314a is recorded on the negative film 331. When enlarged-width print data 314a is not detected; that is, in the case of printing a print in regular size (corresponding 324a in FIG. 16), a print in regular size is printed as indicated by 324a in FIG. 19. In the case of the detecting of the enlarged-width print data 314a by the data reader 335, in response to the signal from the control unit 345, the head sliding motor 339 is energized so that the head 338 is moved upwardly to obtain an enlarged-width print. Furthermore, the auto-focusing motor 337 is energized, a picture to be printed in widthwise direction is sharply focused on the printing paper 342. Furthermore, the opening of the shutter 343 is switched to the enlarged-width printing opening, thereby trimming a picture to be printed in enlarged-width size as indicated by two-dot chain line in FIG. 16. Thereafter, the printing process is started. When the printing process is accomplished in the manner described above, enlarged-width picture is printed on the printing film 342 extended and maintained flat between the printing paper supply unit 340 and the printing paper 341 as indicated by 342b in FIG. 20. That is, the print 342b which is enlarged in the widthwise direction of the print 342a in regular size is printed on the printing paper 342. After the fixing process, the printing paper 342 is cut off along the cutting lines shown in FIG. 19, the desired prints can be obtained. In this case, the short side of the enlarged-width print 342b is equal in length to the short side of the print in regular size. Then, as shown in FIG. 17, on the same rolled printing paper, the prints in regular size and the prints enlarged in the widthwise direction can be effectively laid out.

Figure 20:
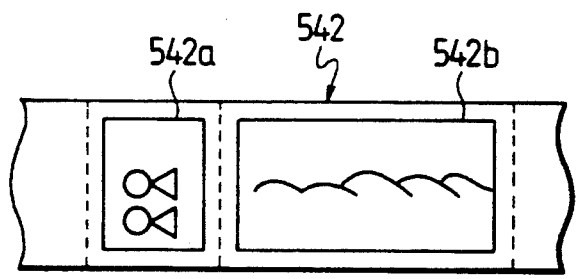
FIG. 20 is an another example of the print layout.

So far it has been described that in the case of printing a enlarged-width print, only the head 338 is moved upwardly, but when the head 338 is moved upwardly while it is rotated through 90° in the case of printing, a enlarged-width print 542b which is rotated through 90° with respect to a print 542a can be printed on the printing paper 542 as shown in FIG. 20. In this case, the short side of the enlarged print 542b is substantially equal in length to the long side of the print 542a in regular size. Then, as is apparent from FIG. 20, the layout of the prints in regular size and the enlarged-width prints may be efficiently effected. In this embodiment, the aspect ratio between the lengths of the short and long sides of enlarged-width print can be uniquely determined, but when it is desired to have two or more ratios, the detection switches and the light emitting means are increased in number accordingly, and in response to data therefrom, a desired ratio can be determined. In this embodiment, the switching of the field-of-view is mechanically carried out, but it is to be understood that the present invention is not limited thereto and that the selection of the field-of-view may be carried out by other means such as a liquid crystal and the like.

Figure 21:
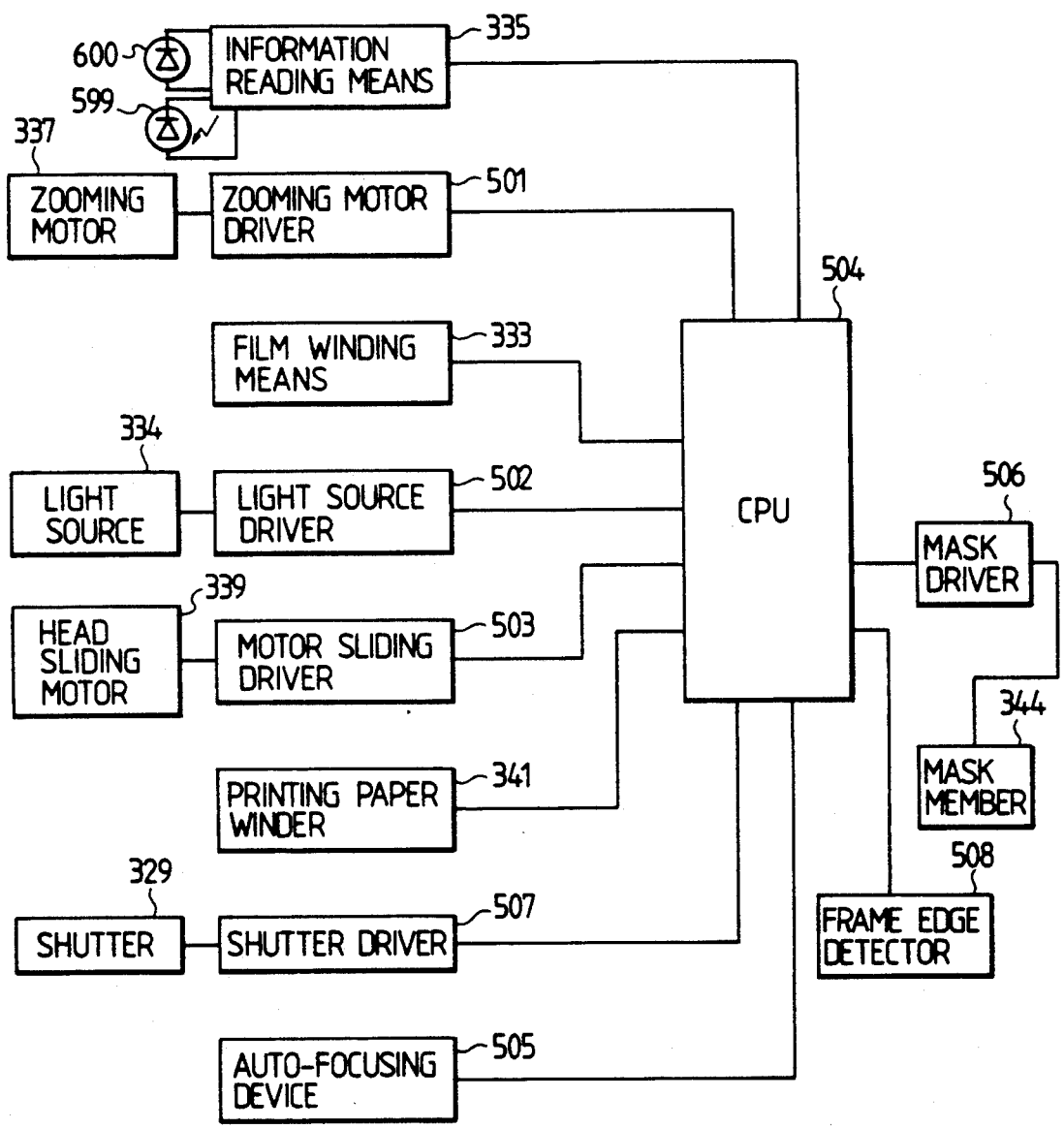
FIGS. 21 and 22, 22A-22C respectively, show a block diagram of the circuit in the printing apparatus shown in FIG. 18 and the operation flowchart thereof.

FIG. 21 illustrates a diagram of an electric circuit of the printer described above with reference to FIG. 18. In FIG. 21, reference numeral 335 represents an information reading means which has two sensors 599 and 600 so as to read out the width enlargement data 314a from the film and transmit them to the CPU 504; 501, a zoom driver for energizing the zoom motor 337 in order to obtain a print in the desired size; 333, the film winding unit for winding the film so that a desired frame thereof is located at a predetermined position in response to the control signal from CPU 504; 502, a light source driver for controlling the light source unit 334 as well as one or more color filters (not shown); 503, a sliding motor driver for controlling the head sliding motor 339 which causes the vertical sliding of the head 338 depending upon a desired size of a print; 341, the printing paper winding unit for winding the printing paper by the length of one frame at a time after exposure of the preceding frame; 507, a shutter driver for driving the shutter 329, thereby controlling the exposure in printing; 505, an automatic focusing device for automatically zooming the printing zoom lens 336 so that a picture can be sharply focused on the printing paper 342; 506, a mask driver for driving the mask member 344 in order to mask an unexposed portion of the printing paper 342; and 508, the edge frame detector.

The operation of the circuit shown in FIG. 21 will be described hereafter by following the flowchart of FIG. 22.

Figures 22, 22A:
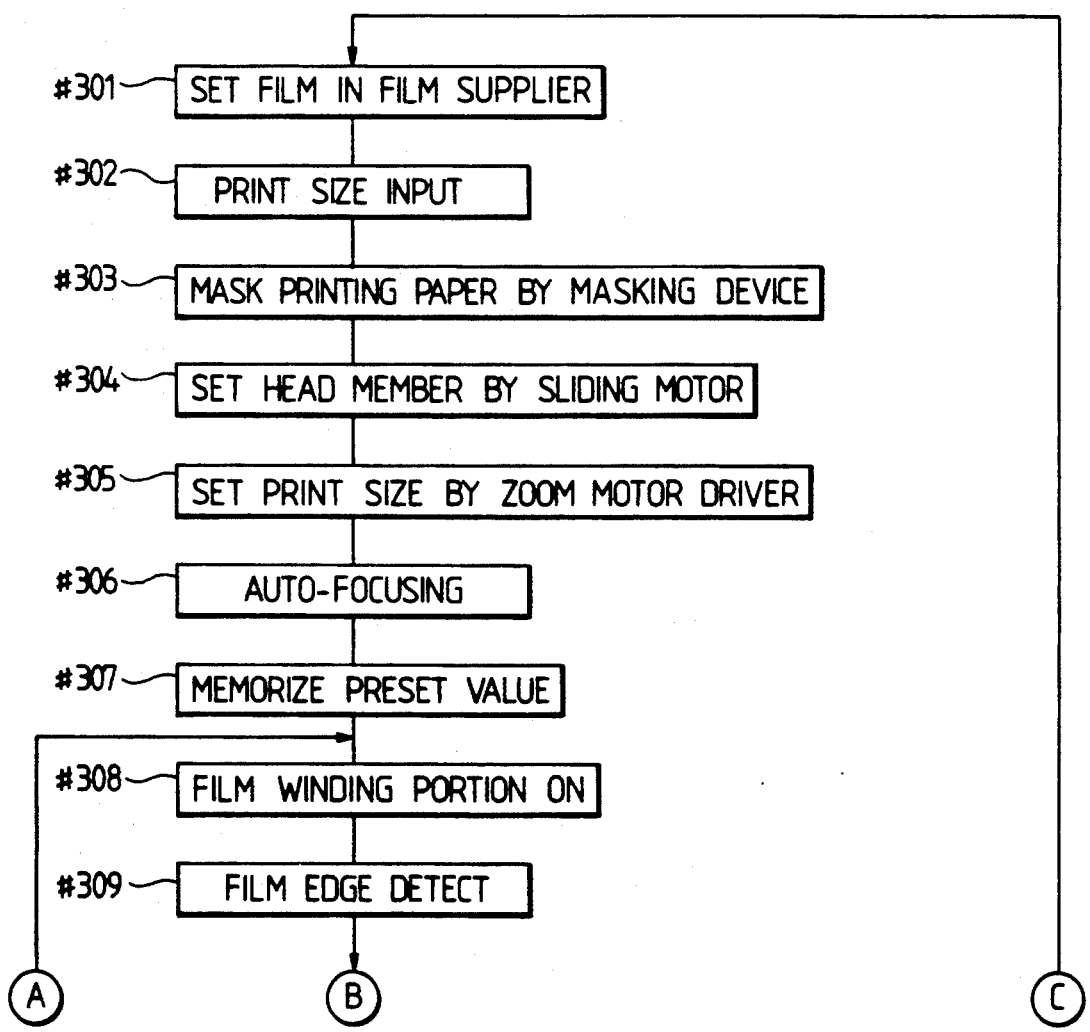
Figure 22B:
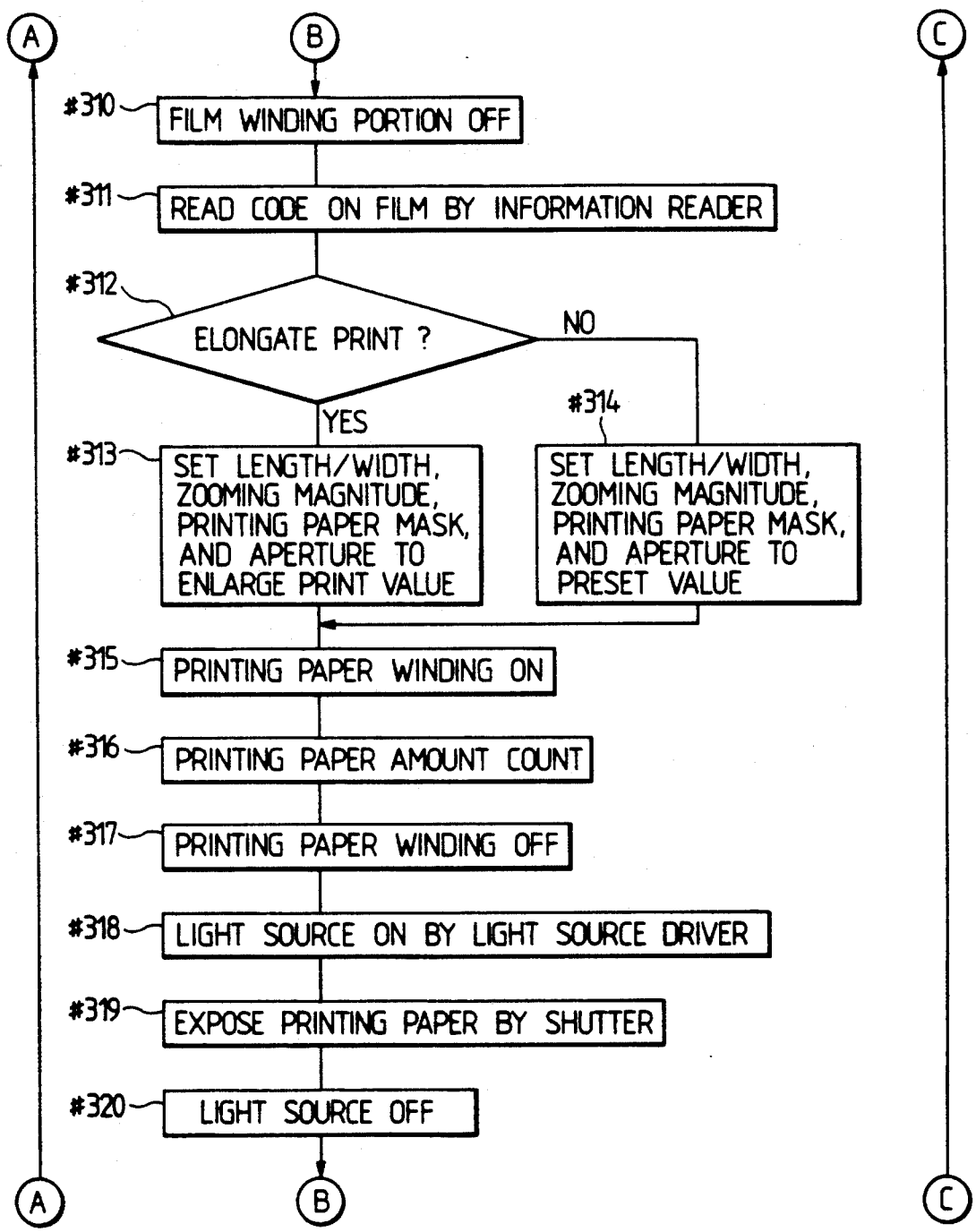
Figure 22C:
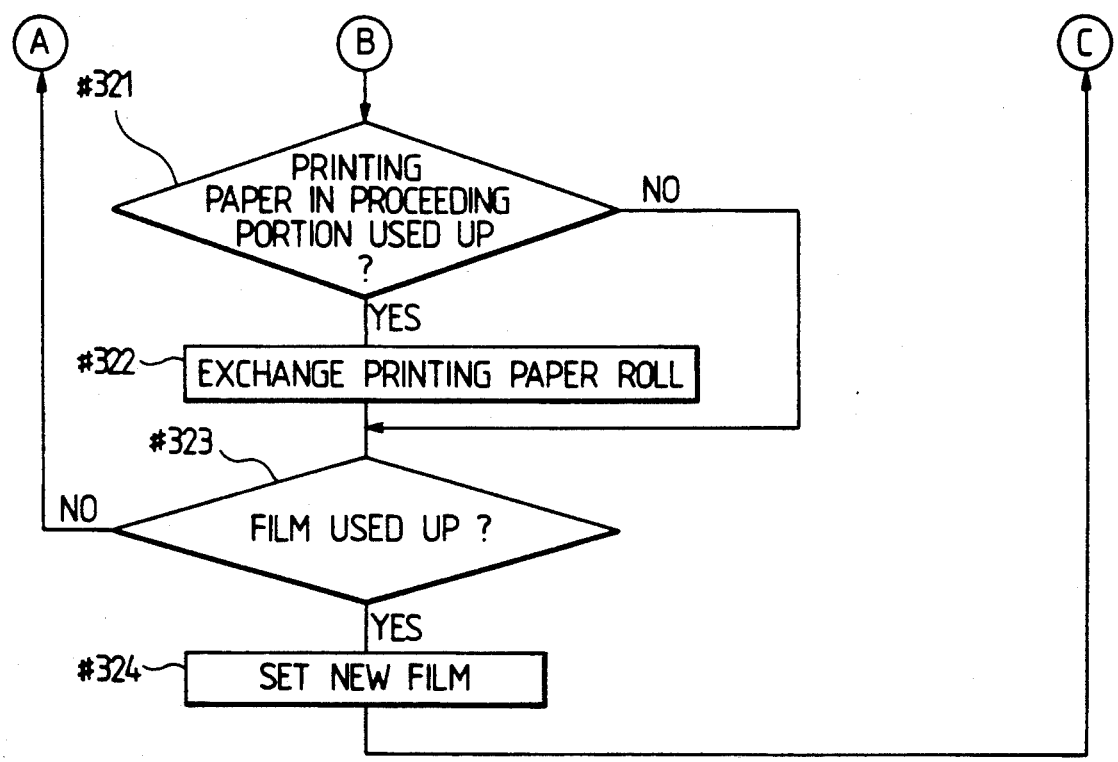

In FIGS. 21 and 22, a film reel is set in a film supplier 322. A printing paper is also set in a printing paper supplier 340. In accordance with the printing size which is obtained in step #302, a predetermined portion of the printing paper is masked by the mask driver at step #303 and the printer head 338 is set by the sliding motor driver 503. At the next step #305, the zoom lens 336 is controlled by the zoom motor driver 501 so that the image to be printed becomes the predetermined size on the printing paper. The image on the printing paper is arranged to be sharp by the auto focusing device 505 at step #306. The auto focusing device may be located near to the zoom lens and it also may be possible, for automatically control the focusing state, to control the height of the head of the device 338. At step #307, the present value described above are memorized. In steps #308 to #310, the film winder 333 starts (#308), the film edge detector 508 detects the edge of the frame (#309) and the film winder 333 stops. Next at step #311, the code 314a on the film is read by the information reader 335. Step #312 judges the status of the code 314a. If the code 314a is recorded, the process proceeds to step #313 for performing an enlarged-width print. If no code is recorded, normal printing is performed at step #314. At step #313, datas of length/width, zoom signal, printing paper mask, and aperture are set for the enlarged-width printing. On the other hand, at step #314, the data above are set for normal printing. In the steps #315 to #317, the printing paper winder 341 starts (#315), a predetermined feed amount of the paper is counted (#316), and the printing paper winder 341 stops (#317) thereby setting the printing paper. At step #318, the light source is turned on, and the shutter 343 is opened for the predetermined exposure time at step #319. In the present embodiment, only one exposure is performed as described above. However, for color photography, a plurality of exposures with changing filters is required. At next step #320, the light source 334 is turned off. Whether the printing paper still remains in the printing paper supplier is cheched at step #321. If the printing paper still remains, the process jums to step #323, and if not, a new printing paper roll is set. At step #323, whether the film in the film supplier is used up is checked. If it remains, the process returns to step #308 and the same sequence will be repeated. If no film remains, a new film reel is set to the film supplier 332 and the step returns to #301.

In the cases of the printers of the types described above, respectively, with reference to FIGS. 6 and 18, in order to cut the prints after printing, it suffices to store the length of the printing paper to be cut and then in response to the cutting-length data read out cut the printing paper after the completion of the fixing process.

In the above two embodiments of the present invention, light emitting means such as light-emitting diodes are flashed to record a desired size of each print, but it is to be understood that the present invention is not limited to such, and that any other suitable means and methods may be used. For instance, a piece of light reflecting paper may be bonded or a magnetic medium may be used. Alternatively, the size data may be stored in an involatile storage device such as a magnetic recording medium, an EPROM, an EEPROM or the like in the form of a card which is detachably mounted on, for instance, a film cartridge.

Recording of the data into such means as described above is possible when suitable interfaces are attached to the output terminals $O_3$ and $O_4$ of CPU 101 or the output terminals $O_{103}$ and $O_{103}$ of CPU 401.

Furthermore, codes to be recorded on a film are increased in number so that prints in various sizes may be obtained.

It should be noted that, in the embodiments described above, description has been made for a camera using a film. However, it is apparent that the present invention is applicable for a camera using a magnetic recording medium, e.g. video camera and the like, or other types of camera using various kinds of image recording media.

What is claimed is:

1. A photographic print control system comprising:
  a camera which comprises:
   (a) setting means for setting a size of an area to be printed on a recording medium;
   (b) recording means for recording information pertaining to the set size, wherein said recording means comprises an optical recording means; and
   (c) cancelling means for cancelling the information recorded by said recording means; and
  a printing apparatus which comprises:
   (a) reading means for reading the information recorded by said recording means; and
   (b) printing means for printing a photographed image in the set size in response to the information read by said reading means.

2. A system according to claim 1, wherein said cancelling means comprises an optical means.

3. A photographic print control system comprising:
  a camera which comprises:
   (a) setting means for setting a size of an area to be printed on a recording medium;
   (b) recording means for recording information pertaining to the set size, wherein said recording means comprises a mechanical recording means; and
   (c) cancelling means for cancelling the information recorded by said recording means; and
  a printing apparatus which comprises:
   (a) reading means for reading the information recorded by said recording means; and
   (b) printing means for printing a photographed image in the set size in response to the information read by said reading means.

4. A photographic print control system comprising:
  a camera which comprises:
   (a) setting means for setting a size of an area to be printed on a recording medium;
   (b) recording means for recording information pertaining to the set size; and (c) cancelling means for cancelling the information recorded by said recording means, wherein said cancelling means comprises an optical means; and a printing apparatus which comprises:

(a) reading means for reading the information recorded by said recording means; and (b) printing means for printing a photographed image in the set size in response to the information read by said reading means.

5. A photographic print control system comprising: a camera which comprises:

(a) setting means for setting a size of an area to be printed on a recording medium;

(b) recording means for recording information pertaining to the set size;

(c) cancelling means for cancelling the information recorded by said recording means; and (d) returning means for returning said setting means to a predetermined state in response to a feeding operation of an image recording medium; and a printing apparatus which comprises:

(a) reading means for reading the information recorded by said recording means; and (b) printing means for printing a photographed image in the set size in response to the information ready by said reading means.

6. A system according to claim 5 wherein said recording means comprises an optical recording means.

7. A photographic print control system comprising: a camera which comprises:

(a) setting means for setting a size of an area to be printed on a recording medium;

(b) recording means for recording information pertaining to the set size; and (c) cancelling means for cancelling the information by said recording means, wherein said cancelling means comprises a pawl to prevent an inadvertent operation; and a printing apparatus which comprises:

(a) reading means for reading the information recorded by said recording means; and (b) printing means for printing a photographed image in the set size in response to the information read by said reading means.

8. A photographic print control system comprising: a camera which comprises:

(a) setting means for setting a size of an area to be printed on a recording medium;

(b) recording means for recording information pertaining to set size; and (c) cancelling means for cancelling the information recorded by said recording means; and a printing apparatus which comprises:

(a) reading means for reading the information recorded by said recording means; and (b) printing means for printing a photographed image in the set size in response to the information read by said reading means, wherein said printing means comprises means for performing the printing by varying a relative angle between the image recorded by the camera in response to the information read by said reading means and the recording medium to which said image is to be printed.

9. A system according to claim 8, wherein said relative angle to be varied is set at 90 degrees.

10. A photographic print control system comprising: a camera which comprises:

(a) setting means for setting a size of an area to be printed on a recording medium, wherein said setting means comprises means for setting the length and width of the area to be printed;

(b) recording means for recording information pertaining to the set size; and (c) cancelling means for cancelling the information recorded by said recording means; and a printing apparatus which comprises:

(a) reading means for reading the information recorded by said recording means; and (b) printing means for printing a photographed image in the set size in response to the information read by said reading means, wherein said printing means comprises means for keeping at least one side length constant when the information read by said reading means shows a different length and width rate of said area to be printed.

11. A camera comprising:

(a) recording means for recording information pertaining to a size of an area to be printed on a recording medium;

(b) cancelling means for cancelling the information recorded by said recording means; and (c) returning means for returning said recording means to a predetermined state in response to a feeding operation of an image recording medium.

12. A camera comprising:

(a) recording means for recording information pertaining to a size of an area to be printed on a recording medium;

(b) cancelling means for cancelling the information recorded by said recording means, wherein said cancelling means comprise a pawl to prevent an inadvertent operation of said cancelling means.

13. A photographic print control system comprising: a camera which comprises:

(a) setting means for setting a size of an area to be printed on a recording medium;

(b) first recording means for recording information pertaining to the set size; and (c) second recording means for subsequently recording information indicating that the recording information pertaining to the set size is in error; and a printing apparatus which comprises:

(a) reading means for reading the information recorded by said first and second recording means; and (b) printing means for printing a photographed image in the set size in response to the information read by said reading means.

14. A printing control system, comprising:

(a) reading means for reading information which is recorded by a camera, pertaining to a size of an area to be printed on a recording medium; and (b) printing means for printing a photographed image corresponding to the set size in response to the information read by said reading means, wherein said printing means comprises means for performing printing by varying a relative angle between the image recorded by the camera in response to the information read by said reading means and the recording medium to which said image is to be printed.

15. A printing control system according to claim 14, wherein said relative angle to be varied is set at 90 degrees.

16. A printing control system, comprising:

(a) reading means for reading information which is recorded by a camera, pertaining to a size of an area to be printed on a recording medium; and (b) printing means for printing a photographed image corresponding to the set size in response to the information read by said reading means, wherein said printing means comprises means for keeping at least one side length constant when the information read by said reading means shows a different length and width rate of said area to be printed.

* * * * *

UNITED STATES PATENT AND TRADEMARK OFFICE
CERTIFICATE OF CORRECTION

PATENT NO. : 5,151,726
DATED : September 29, 1992
INVENTOR(S) : Tomonori IWASHITA, et al.

Figure 12:
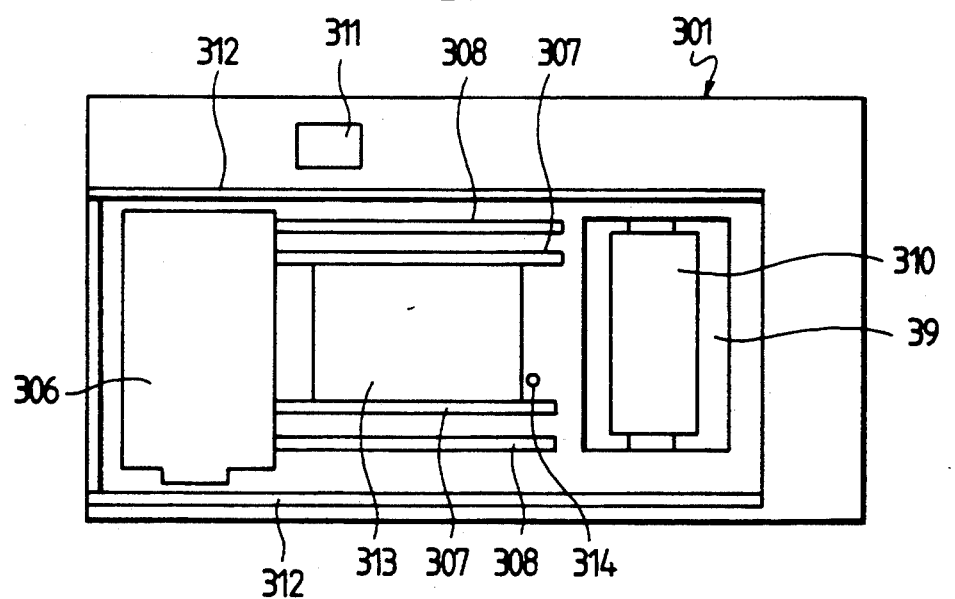
FIG. 12 is the camera of FIG. 11 shown from the back side.

It is certified that error appears in the above-identified patent and that said Letters Patent is hereby corrected as shown below:

Figure 12 OF THE DRAWINGS:

In Fig. 12, "39" should read --309--.

COLUMN 1:

line 10, "spreaded" should be deleted; and
line 16, "sourvenir pictures" should read --souvenir pictures,--.

COLUMN 2:

line 20, "an" should be deleted; and
line 38, "22A-22C" should read --22A-22C,--.

COLUMN 3:

line 41, "delivering a" should read --delivering--.

COLUMN 5:

line 41, "two sensor 299 and 200" should read --two sensors 299 and 200--;
line 63, "shift" should read --shifting--; and
line 67, "106" should read --206--.

COLUMN 6:

line 5, "107" should read --207--.
line 12, "step #901" should read --step #101--;

UNITED STATES PATENT AND TRADEMARK OFFICE
CERTIFICATE OF CORRECTION

PATENT NO. : 5,151,726

DATED : September 29, 1992

INVENTOR(S) : Tomonori IWASHITA, et al.

It is certified that error appears in the above-identified patent and that said Letters Patent is hereby corrected as shown below:

```
line 28, "set" should read --sets--;
line 29, "#101," should read --#110.--;
line 32, "auto focusing" should read --auto-focusing--;
line 36, "step 121," should read --step #112,--;
line 50, "driver 102" should read --driver 202--; and
line 54, "multi" should read --multiple--.
```

COLUMN 7:

```
line 14, "a widthwise enlarged" should read --an
         enlarged-width--;
line 17, "or" should read --of--;
line 18, "FIG. 13" should read --FIG. 12--;
line 24, "301, a spool" should read --310, a spool--;
line 38, "frame 136a" should read --frame 316a--;
line 39, "frame 136b" should read --frame 316b--;
line 45, "view-of-field" should read --field-of-view--; and
line 56, "a" should read --an--.
```

COLUMN 8:

```
line 2, "312" should read --321--;
line 15, "light emitting means 114" should read
         --light emitting means 314--;
line 41, "member 136c" should read member 316--; and
line 67, "lever 430." should read --lever 304.--.
```

UNITED STATES PATENT AND TRADEMARK OFFICE
CERTIFICATE OF CORRECTION

PATENT NO. : 5,151,726

DATED : September 29, 1992

INVENTOR(S) : Tomonori IWASHITA, et al.

It is certified that error appears in the above-identified patent and that said Letters Patent is hereby corrected as shown below:

COLUMN 9:

line 2, "FIG. 18" should read --FIG. 17--;
line 7, "step #120," should read --step #201,--;
line 8, "#203" should read --step #203--;
line 28, "represent" should read --represents--;
line 45, "form" should read --from--;
line 58, "next" should read --next,--;
line 64, "data reader 35" should read --data reader 335--; and
line 68, FIG. 16)," should read --FIG. 15),--.

COLUMN 10:

line 1, "324a" should read --342a--;
line 7, "in width-" should read --in the width---;
line 12, "FIG. 16," should read --Fig. 15--;
line 18, "342b" should read -542b--;
line 26, "FIG. 17," should read --Fig. 20--;
line 30, "a" should read --an--; and
line 32, "a" should read --an--.

COLUMN 11:

line 15, "322 " should read --332 in step #301.--;
line 20, "driver 503 " should read --driver 503 at step #304.--;

UNITED STATES PATENT AND TRADEMARK OFFICE
CERTIFICATE OF CORRECTION

PATENT NO. : 5,151,726
DATED : September 29, 1992
INVENTOR(S) : Tomonori IWASHITA, et al.

It is certified that error appears in the above identified patent and that said Letters Patent is hereby corrected as shown below:

line 27, "control" (first occurrence) should read --controlling--;
line 32, "stops. Next" should read --stops at step #310. Next,--;
line 54, " cheched " should read --checked--; and
line 55, "jums" should read --jumps--.

COLUMN 13:

line 25, "ready" should read --read--;
line 27, "claim 5" should read --claim 5,--;
line 36, "information" should read --information recorded--; and
line 51, "to set" should read --to the set--.

COLUMN 14:

line 31, "medium;" should read --medium; and--.

Signed and Sealed this

Twenty-first Day of December, 1993

Attest:

BRUCE LEHMAN

Attesting Officer

Commissioner of Patents and Trademarks